Nov. 16, 1965   H. L. MENDENHALL ETAL   3,217,828
SEISMIC PROSPECTING
Filed Jan. 12, 1962   3 Sheets-Sheet 1

INVENTORS
H.L. MENDENHALL
P.J. NAQUIN, JR.
BY *Young & Quigg*
ATTORNEYS

Nov. 16, 1965    H. L. MENDENHALL ETAL    3,217,828
SEISMIC PROSPECTING

Filed Jan. 12, 1962    3 Sheets-Sheet 2

INVENTORS
H. L. MENDENHALL
P. J. NAQUIN, JR.
BY
*Young & Quigg*
ATTORNEYS

Nov. 16, 1965 H. L. MENDENHALL ETAL 3,217,828
SEISMIC PROSPECTING
Filed Jan. 12, 1962 3 Sheets-Sheet 3

INVENTORS
H.L. MENDENHALL
P.J. NAQUIN, JR.
BY
Young & Quigg
ATTORNEYS

United States Patent Office 3,217,828
Patented Nov. 16, 1965

3,217,828
SEISMIC PROSPECTING
Harold L. Mendenhall and Paul J. Naquin, Jr., Bartlesville, Okla., assignors to Phillips Petroleum Company, a corporation of Delaware
Filed Jan. 12, 1962, Ser. No. 165,746
2 Claims. (Cl. 181—.5)

This invention relates to seismic prospecting methods and to the interpretation of seismic records.

It is common practice in the petroleum exploration industry to utilize seismic waves for the purpose of mapping subterranean formations. Vibrations are imparted to the earth and the resulting waves which are reflected from subterranean formations back to the surface are detected by a plurality of seismometers spaced from the point at which vibrations were imparted to the earth. By comparing the arrival times of reflected vibrations in a plurality of seismometer recordings, valuable information can often be obtained regarding the depth and dip of subterranean reflecting beds. However, random noise vibrations often appear in the resulting seismic records which make the identification of reflected events difficult, if not impossible.

A number of procedures have been developed to aid in the interpretation of seismic records to permit the identification of reflections in the presence of random noise vibrations. One procedure that is particularly useful involves adding a group of seismic traces to produce a single trace. The desired reflections tend to add in the composite record, whereas the random noise vibrations tend to cancel one another. This increases the signal-to-noise ratio in the records. However, the compositing of records in this manner requires that the desired reflections occur at the same time with respect to one another in the traces to be added. Variations in elevation between different shot points and seismometers and differences in thickness of the weathered layer account for some time differences in alignment of signals. These differences are often referred to as static timing errors because they are the same for all reflections appearing on a given trace. The other type of timing error is caused by differences in the geometric relationship between the shot point, geophone and reflecting bed. Since a wave front is involved, this latter timing error changes with record time and is generally not the same at any two places on the record. This second type of error is often referred to as a dynamic error.

The present invention is directed to a procedure for obtaining and combining seismic records so as to permit the identification of desired reflections in the presence of random noise vibrations. The first step in this procedure is to combine a plurality of seismic records in such a manner that reflections from common regions of subterranean formations are summed to produce a composite record. The second step is to combine a plurality of the first composite records with different time displacements therebetween so as to obtain second composite records. The different time displacements employed in the second compositing step compensate for different dip angles of the reflecting beds so that common reflections can be identified readily for different angles of dip.

Accordingly, it is an object of this invention to provide a procedure for combining seismic records in such a manner as to identify common reflections.

Another object of this invention is to provide a method of combining a plurality of seismic records in such a manner as to permit identification of reflecting beds having different dip angles.

A further object is to provide a procedure for increasing the signal-to-noise ratio in a plurality of seismic traces.

Other objects, advantages and features of the invention should become apparent from the following detailed description, taken in conjunction with the accompanying drawing in which.

Figure 1:
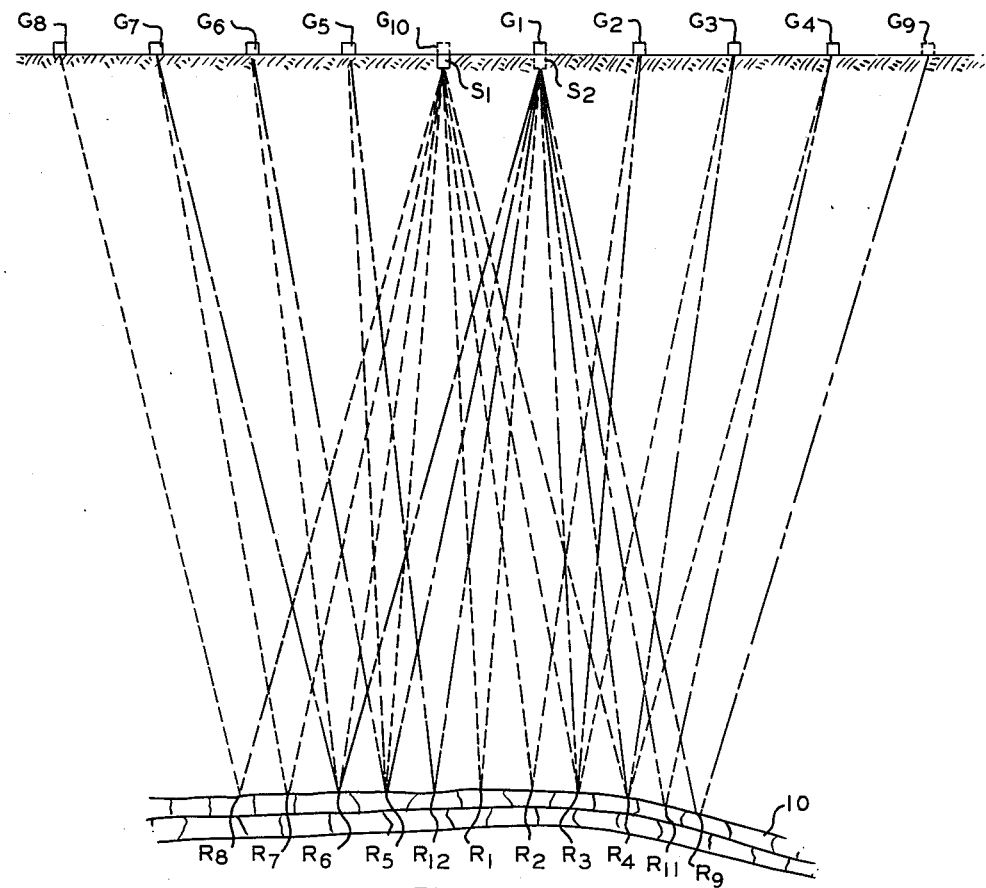
FIGURE 1 is a schematic representation of the procedure employed to obtain the initial seismic records in accordance with this invention.

Referring now to the drawing in detail and to FIGURE 1 in particular, vibrations are first imparted to the earth at a point $S_1$. This can be accomplished by detonating an explosive charge in a shot hole or by imparting mechanical vibrations to the earth, such as by dropping a weight. A plurality of seismometers $G_1$ to $G_8$ are positioned along a line in spaced relationship with shot point $S_1$ so as to record the resulting vibrations. Although eight seismometers are illustrated in the drawing to simplify the description, it is the usual practice to employ a larger number of seismometers, such as twenty-four, for example. These seismometers are positioned on both sides of the shot point so that a maximum amount of information is obtained from each shot. The distances between adjacent seismometers are equal and equal to the distances seismometers $G_1$ and $G_5$ are spaced from shot point $S_5$.

The next step in the procedure of this invention is to impart vibrations to the earth at a second point $S_2$ which is located at the point seismometer $G_1$ initially was positioned. A seismometer $G_9$ is added to the system and the seismometer initially at the position $G_8$ can be removed. This procedure is then continued by imparting vibrations to the earth in sequence at points $G_2$, $G_3$, $G_4$, $G_9$, etc. The resulting vibrations are detected on both sides of each shot point.

From an inspection of FIGURE 1, it can be seen that many of the individual seismometers receive vibrations from two different shot points which are reflected from common regions of subterranean reflecting bed 10. For example, vibrations emitted from point $S_1$ are reflected from point $R_3$ and received by seismometer $G_3$. With a large number of shot points and seismometers, many signals are received from the individual reflecting regions. In accordance with the first step of the process of this invention, the vibrations reflected from these common regions are added to produce a composite record.

Figure 2:
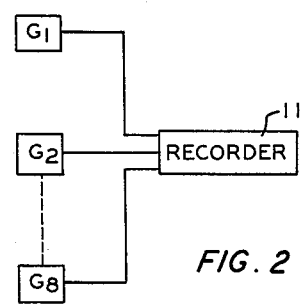
FIGURE 2 is a schematic representation of the recording system employed in conjunction with the method shown in FIGURE 1.

The output signals of seismometers $G_1$ to $G_8$, for example, are applied to respective channels of a recorder 11, as shown in FIGURE 2. This recorder is advantageously a magnetic recorder which readily permits the individual signals to be reproduced for subsequent composition. While adjacent seismometers receive reflections from common subterranean formations, it is extremely difficult to identify any common reflection patterns in the recorded traces.

Figure 4:
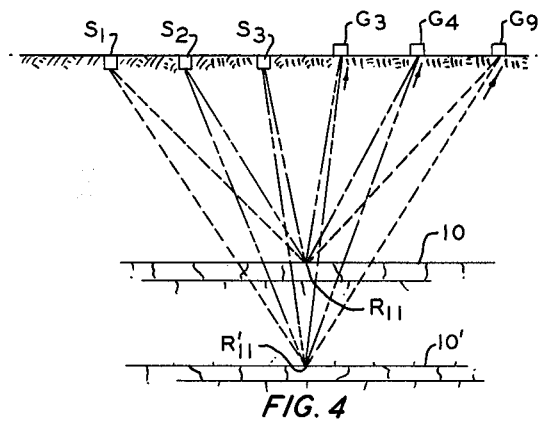
FIGURE 4 is a schematic representation of typical reflected signals which are combined in accordance with this invention.
Figure 5:
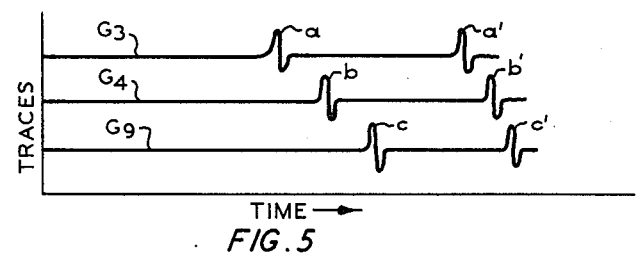
FIGURE 5 is a schematic representation of typical seismic records obtained by the seismometers illustrated in FIGURE 4.

As previously mentioned, the first step of this invention involves compositing individual records in a manner so as to add reflections from common subterranean reflecting formations. As illustrated in FIGURE 4, seismometers $G_3$, $G_4$ and $G_5$ receive reflections emitted from respective shot points $S_3$, $S_2$ and $S_1$ and which are reflected from region $R_{11}$ of reflecting bed 10. However, these seismometers also receive signals which are reflected from a region $R_{11}'$ of a lower reflecting bed 10'. FIGURE 5 is a schematic illustration of ideal reflections received by the seismometers of FIGURE 4. The records received by the seismometers $G_3$, $G_4$ and $G_9$ contain signals $a$, $b$ and $c$ which represent the reflections from bed 10. The times at which these reflections occur, taken with respect to the zero time that the individual vibrations are imparted to the earth, are different in the three traces due to the different lengths of travel paths, as illustrated in FIGURE 5. The seismometer records contain second signals $a'$, $b'$ and $c'$ which represent reflections from lower bed 10'. While these second reflections occur at progressively later times in the three records, the time differences between the second reflections are less than for the primary reflections. This difference is evident from an inspection of the geometry of FIGURE 4.

Figure 6:
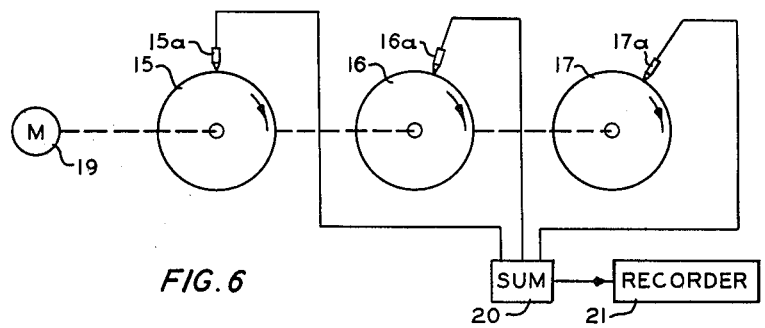
FIGURE 6 is a schematic representation of the recording apparatus which can be utilized to carry out the first step of the process of this invention.

In order to combine the signals which are reflected from common regions of the subterranean formations, it is necessary to displace the individual traces, such as shown in FIGURE 5, with respect to one another so that the common reflections occur at the same time. This is accomplished by means of the apparatus illustrated in FIGURE 6. The original traces recorded by recorder 11 are subsequently transferred to individual drums 15, 16 and 17 of a magnetic recording and reproducing system. The signals obtained by the procedure illustrated in FIGURE 1 are recorded on the individual drums of FIGURE 6 such that reflections having travel paths of substantially the same length are positioned on common drums. For purposes of illustration, it will be assumed that the signals received by geophones $G_3$, $G_4$ and $G_9$ of FIGURE 4 are applied to respective drums 15, 16 and 17 of FIGURE 6. These signals are applied to the recording apparatus of FIGURE 6 either without any time displacements or with displacements to compensate for the static corrections, if such information is readily available. The three drums are rotated in unison by a common drive mechanism such as motor 19. Reproducing heads 15a, 16a, and 17a are positioned adjacent respective drums 15, 16 and 17. These reproducing heads are connected to the inputs of a summing network 20, the output of which is applied to a recorder 21. Reproducing heads 15a, 16a and 17a are positioned initially with respect to the associated drums so as to compensate for assumed differences in travel path length of the reflections illustrated in FIGURE 4. However, these time differences are merely estimates because the desired reflections can not be observed in the initial records. The drums are rotated and the reproduced signals are summed. This procedure is then repeated with different displacements of the reproducing heads. The summing procedure is repeated in this manner a plurality of times with different assumed time differences. The resulting composite signals obtained generally exhibit a maximum when the proper time alignment has been assumed.

Figure 7:
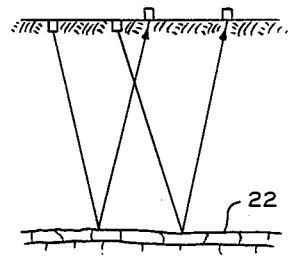
FIGURES 7 and 8 are schematic representations of reflected ray paths wherein the subterranean reflected formations have different dips.
Figure 8:
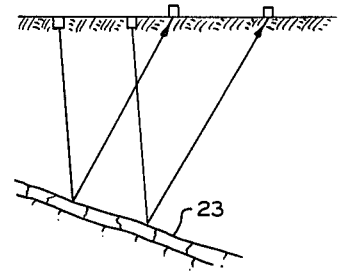

The compositing procedure thus far described produces records which are a definite improvement over the records obtained by recording the seismometer outputs. In the discussion up to this point, it has been assumed that the reflecting beds are substantially horizontal. However, the primary objective of seismic procedures is to determine the dips of reflecting beds. If the reflecting bed is not horizontal, additional time variations are introduced in adjacent records. This can readily be seen from an inspection of the geometry of FIGURES 7 and 8. Vibrations from adjacent shot points to adjacent geophones in FIGURE 7 travel equal paths when reflecting bed 22 is horizontal. However, these travel paths are not equal when bed 23 of FIGURE 8 is dipped.

The second step in the procedure of this invention is to combine a plurality of the composite records previously obtained with different assumed dip angles of the reflecting beds. This can be accomplished by means of the apparatus illustrated in FIGURE 3. Composite records produced by the apparatus of FIGURE 6 which contain signals from adjacent reflecting regions are recorded adjacent one another on a magnetic tape 25. A plurality of reproducing heads 26 to 32 are positioned adjacent respective channels of tape 25. These reproducing heads are connected to the inputs of a summing device 33, the output of which is applied to a recorder 34. The signals applied to tape 25 are reproduced and summed a plurality of times with different displacements between the reproducing heads. It has been found that the time displacements illustrated in the following table are adequate to search seismic records for all normally encountered dips.

| Trace No. | 1 | 2 | 3 | 4 | 5 | 6 | 7 |
|---|---|---|---|---|---|---|---|
| Dip angle: | | | | | | | |
| +60 | −30 | −20 | −10 | 0 | +10 | +20 | +30 |
| +48 | −24 | −16 | −8 | 0 | +8 | +16 | +24 |
| +36 | −18 | −12 | −6 | 0 | +6 | +12 | +18 |
| +24 | −12 | −8 | −4 | 0 | +4 | +8 | +12 |
| +12 | −6 | −4 | −2 | 0 | +2 | +4 | +6 |
| 0 | 0 | 0 | 0 | 0 | 0 | 0 | 0 |
| −12 | +6 | +4 | +2 | 0 | −2 | −4 | −6 |
| −24 | +12 | +8 | +4 | 0 | −4 | −8 | −12 |
| −36 | +18 | +12 | +6 | 0 | −6 | −12 | −18 |
| −48 | +24 | +16 | +8 | 0 | −8 | −16 | −24 |
| −60 | +30 | +20 | +10 | 0 | −10 | −20 | −30 |

Figure 3:
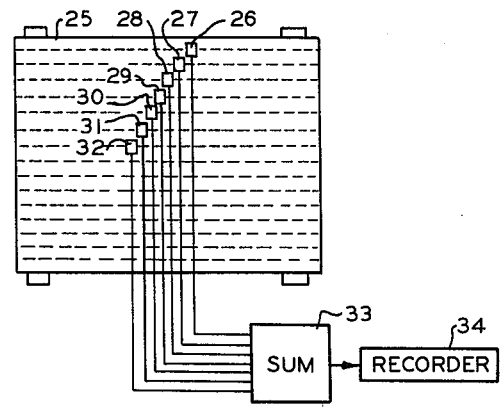
FIGURE 3 is a schematic representation of signal reproducing apparatus employed in the method of this invention.

For purposes of discussion, it will be assumed that a dip angle of +60 is to be searched first. The seven reproducing heads 26 to 32 of FIGURE 3 are positioned adjacent the respective top seven recorded traces on drum 25. Heads 26, 27 and 28 are displaced to the right of head 29 by amounts that correspond to respective times of 30, 20 and 10 milliseconds of drum rotation. Heads 32, 31 and 30 are displaced to the left of head 29 by respective times of 30, 20 and 10 milliseconds. Drum 25 is then rotated and the reproduced signals are summed to provide a trace on recorder 34. The next step is to move each of the recording heads of FIGURE 3 down to the next lower trace, while retaining the same spacing relative to one another, to obtain a second sum. Actually, this is normally accomplished by connecting the input terminals of summing unit 33 to different heads, not all of which are shown, associated with the traces on drum 25. This procedure is repeated by moving all of the heads downwardly stepwise to produce a plurality of combined signals.

The foregoing procedure is then repeated for each of the assumed dip angles to be searched. The spacings between the reproducing heads for each search are indicated in the above table. While seven reproducing heads are shown in FIGURE 3, fewer or more can be used to obtain each sum, depending upon the degree of correlation needed or desired.

While this invention has been described in conjunction with presently preferred embodiments, it should be evident that it is not limited thereto.

What is claimed is:

1. In a seismic surveying method wherein vibrations are imparted to the earth sequentially at a plurality of first points spaced along a line on the surface of the earth, the resulting vibrations which are received at the surface of the earth along said line at a plurality of second points are recorded to provide a plurality of first records, individual ones of said first records which are obtained from vibrations being imparted at different times and which contain reflections from a common point on a subterranean reflecting formation are summed so as to produce a second record wherein said reflections are superimposed, and wherein the foregoing summing step is repeated a plurality of times with different groups of said second records so as to obtain a plurality of said second records, each of which contains a plurality of superimposed reflections from a different point on said reflecting formation; the improvement which comprises:

(1) summing a first group of said second records which contain reflections from a series of adjacent points on said reflecting formation, said second records in said first group being displaced from one another by preselected first time intervals prior to being summed, (2) repeating step (1) a plurality of times with different groups of said second records, and (3) thereafter repeating steps (1) and (2) with the same groups of said second records except that the second records are displaced from one another prior to being summed by preselected second time intervals which are different from said first time intervals.

2. In a seismic surveying method wherein vibrations are imparted to the earth sequentially at a plurality of first points spaced along a line on the surface of the earth, the resulting vibrations which are received at the surface of the earth along said line at a plurality of second points spaced equal distances from one another on both sides of said first points are recorded to provide a plurality of first records, the distances from each of said first points to the closest corresponding second points being equal to the distances between adjacent corresponding second points, individual ones of said first records which are obtained from vibrations being imparted at different times and which contain reflections from a common point on a subterranean reflecting formation are summed so as to produce a second record wherein said reflections are superimposed, and wherein the foregoing summing step is repeated a plurality of times with different groups of said second records so as to obtain a plurality of said second records, each of which contains a plurality of superimposed reflections from a different point on said reflecting formation; the improvement which comprises:

(1) summing a group of said second records which contain reflections from respective adjacent points on said reflecting formation, the individual second records being displaced from one another by preselected first time intervals prior to being summed, (2) repeating step (1) a plurality of times except that each group of second signals which is sequentially summed contains reflections from one additional adjacent point on said reflecting formation than the preceding group and also contains reflections from one less point on said reflecting formation than the preceding group, (3) and thereafter repeating steps (1) and (2) with the same groups of said second signals except that the second records are displaced from one another prior to being summed by preselected second time intervals which are different from said first time intervals.

References Cited by the Examiner

UNITED STATES PATENTS

| | | | |
|---|---|---|---|
| 2,473,469 | 6/1949 | Dahm | 181—.5 |
| 2,810,898 | 10/1957 | Meiners | 181—.5 |
| 2,902,107 | 9/1959 | Erath | 181—.5 |
| 2,916,724 | 12/1959 | Peterson | 181—.5 |
| 2,927,565 | 3/1960 | Feagin | 340—15.5 |
| 3,016,970 | 1/1962 | Allyn et al. | 181—.5 |
| 3,040,833 | 6/1962 | Mendenhall et al. | 181—.5 |

SAMUEL FEINBERG, *Primary Examiner.*

CHESTER L. JUSTUS, *Examiner.*